US008577487B2

(12) United States Patent
Tarte et al.

(10) Patent No.: US 8,577,487 B2
(45) Date of Patent: Nov. 5, 2013

(54) CUSTOMIZED INSTRUMENT EVALUATION AND ORDERING TOOL

(75) Inventors: Christopher Tarte, Roanoke, TX (US); Paul Stephen Crowe, Aubrey, TX (US)

(73) Assignee: PACCAR Inc, Bellevue, WA (US)

( * ) Notice: Subject to any disclaimer, the term of this patent is extended or adjusted under 35 U.S.C. 154(b) by 268 days.

(21) Appl. No.: 12/711,054

(22) Filed: Feb. 23, 2010

(65) Prior Publication Data
US 2011/0208339 A1 Aug. 25, 2011

(51) Int. Cl.
G06F 19/00 (2011.01)
G06Q 30/00 (2012.01)

(52) U.S. Cl.
USPC ............... 700/97; 703/8; 715/771; 705/26.5; 705/27.2

(58) Field of Classification Search
USPC ........... 700/95–98, 105; 703/8; 715/738, 739, 715/771; 705/26.5, 27.1, 27.2
See application file for complete search history.

(56) References Cited

U.S. PATENT DOCUMENTS

| 4,072,924 A | 2/1978 | Pomerantz |
| 4,287,503 A | 9/1981 | Sumida |
| 4,621,306 A | 11/1986 | Sell |
| 4,787,039 A | 11/1988 | Murata |
| 4,787,040 A | 11/1988 | Ames |
| 4,809,177 A | 2/1989 | Windle |
| 5,241,295 A | 8/1993 | Madau |
| 5,347,260 A | 9/1994 | Ginzel |
| 5,371,487 A | 12/1994 | Hoffman |
| 5,453,939 A | 9/1995 | Hoffman |
| 5,555,502 A | 9/1996 | Opel |
| 5,757,268 A | 5/1998 | Toffolo |
| 5,764,139 A | 6/1998 | Nojima |
| 5,949,346 A | 9/1999 | Suzuki |
| 5,982,352 A | 11/1999 | Pryor |
| 6,008,800 A | 12/1999 | Pryor |
| 6,009,355 A | 12/1999 | Obradovich |
| 6,119,060 A | 9/2000 | Takayama |
| 6,289,332 B2 | 9/2001 | Menig |
| 6,429,845 B1 | 8/2002 | Unseld |
| 6,434,450 B1 | 8/2002 | Griffin, Jr. |

(Continued)

FOREIGN PATENT DOCUMENTS

JP 2005-067406 A 3/2005

OTHER PUBLICATIONS

Office Action mailed Oct. 16, 2012, in U.S. Appl. No. 12/711,013, filed Feb. 23, 2010, 15 pages.

(Continued)

*Primary Examiner* — Sean Shechtman
(74) *Attorney, Agent, or Firm* — Christensen O'Connor Johnson Kindness PLLC

(57) ABSTRACT

A tool is provided to allow a user to customize the components of a vehicle instrument panel from an Internet-enabled Web site. A user can navigate to a Web site and select a vehicle for configuration. From the Web site, input may be obtained regarding the components and appearance of an instrument panel such as selecting particular types of components (e.g., display panels, gauges, etc.) and arranging where the selected components are to be located. The input generated by a user is translated into a build specification for assembling the instrument panel at the manufacturer. Accordingly, the system and method serve as an interface between the Web site that obtains user configuration data and a manufacturer's system that manages assembly of the vehicle.

20 Claims, 10 Drawing Sheets

(56) References Cited

U.S. PATENT DOCUMENTS

| | | |
|---|---|---|
| 6,564,112 B1 * | 5/2003 | Factor .................. 700/97 |
| 6,667,726 B1 | 12/2003 | Damiani |
| 6,693,523 B1 | 2/2004 | Abel |
| 6,788,196 B2 | 9/2004 | Ueda |
| 6,819,056 B2 | 11/2004 | Lin |
| 6,870,469 B2 | 3/2005 | Ueda |
| 6,874,012 B1 | 3/2005 | St. Pierre |
| 6,959,223 B2 * | 10/2005 | Ogasawara et al. ........ 700/97 |
| 6,972,665 B2 | 12/2005 | Wang |
| 6,990,922 B2 | 1/2006 | Ichikawa |
| 7,009,504 B1 | 3/2006 | Banter |
| 7,015,891 B2 | 3/2006 | Lo |
| 7,084,859 B1 | 8/2006 | Pryor |
| 7,310,071 B2 | 12/2007 | Cuprys |
| 7,499,778 B2 | 3/2009 | Obradovich |
| 7,609,152 B2 | 10/2009 | Crowe |
| 7,642,901 B2 | 1/2010 | Kato |
| 7,683,771 B1 | 3/2010 | Loeb |
| 8,125,346 B2 | 2/2012 | Ballard |
| 2001/0012976 A1 | 8/2001 | Menig |
| 2004/0140948 A1 | 7/2004 | Cuprys |
| 2004/0200923 A1 | 10/2004 | Lee |
| 2004/0207334 A1 | 10/2004 | Lin |
| 2004/0212579 A1 | 10/2004 | Lo |
| 2005/0177287 A1 | 8/2005 | Wang |
| 2006/0036335 A1 | 2/2006 | Banter |
| 2006/0218051 A1 * | 9/2006 | Westberg .................. 705/26 |
| 2006/0274213 A1 | 12/2006 | Saier |
| 2007/0063980 A1 | 3/2007 | Eich |
| 2007/0069880 A1 | 3/2007 | Best |
| 2007/0101290 A1 | 5/2007 | Nakashima |
| 2007/0132572 A1 | 6/2007 | Itoh |
| 2008/0122799 A1 | 5/2008 | Pryor |
| 2008/0129684 A1 | 6/2008 | Adams |
| 2008/0129707 A1 | 6/2008 | Pryor |
| 2008/0133133 A1 | 6/2008 | Abels |
| 2008/0192024 A1 | 8/2008 | Mita |
| 2008/0211652 A1 | 9/2008 | Cope |
| 2008/0238838 A1 | 10/2008 | Cunningham |
| 2008/0244460 A1 | 10/2008 | Louch |
| 2009/0112389 A1 | 4/2009 | Yamamoto |
| 2009/0174533 A1 | 7/2009 | Bowden |
| 2009/0174682 A1 | 7/2009 | Bowden |
| 2009/0300548 A1 | 12/2009 | Sullivan |
| 2011/0175754 A1 | 7/2011 | Karpinsky |
| 2011/0181786 A1 | 7/2011 | Yamazaki |

OTHER PUBLICATIONS

Office Action mailed Dec. 8, 2011, in U.S. Appl. No. 12/711,016, filed Feb. 23, 2010, 31 pages.

Final Office Action mailed May 11, 2012, in U.S. Appl. No. 12/711,016, filed Feb. 23, 2010, 27 pages.

Office Action mailed Dec. 28, 2012, in U.S. Appl. No. 12/711,016, filed Feb. 23, 2010, 29 pages.

Office Action mailed Dec. 9, 2011, in U.S. Appl. No. 12/711,076, filed Feb. 23, 2010, 27 pages.

Final Office Action mailed Sep. 12, 2012, in U.S. Appl. No. 12/711,076, filed Feb. 23, 2010, 30 pages.

Office Action mailed Jul. 13, 2012, in U.S. Appl. No. 12/711,090, filed Feb. 23, 2010, 11 pages.

* cited by examiner

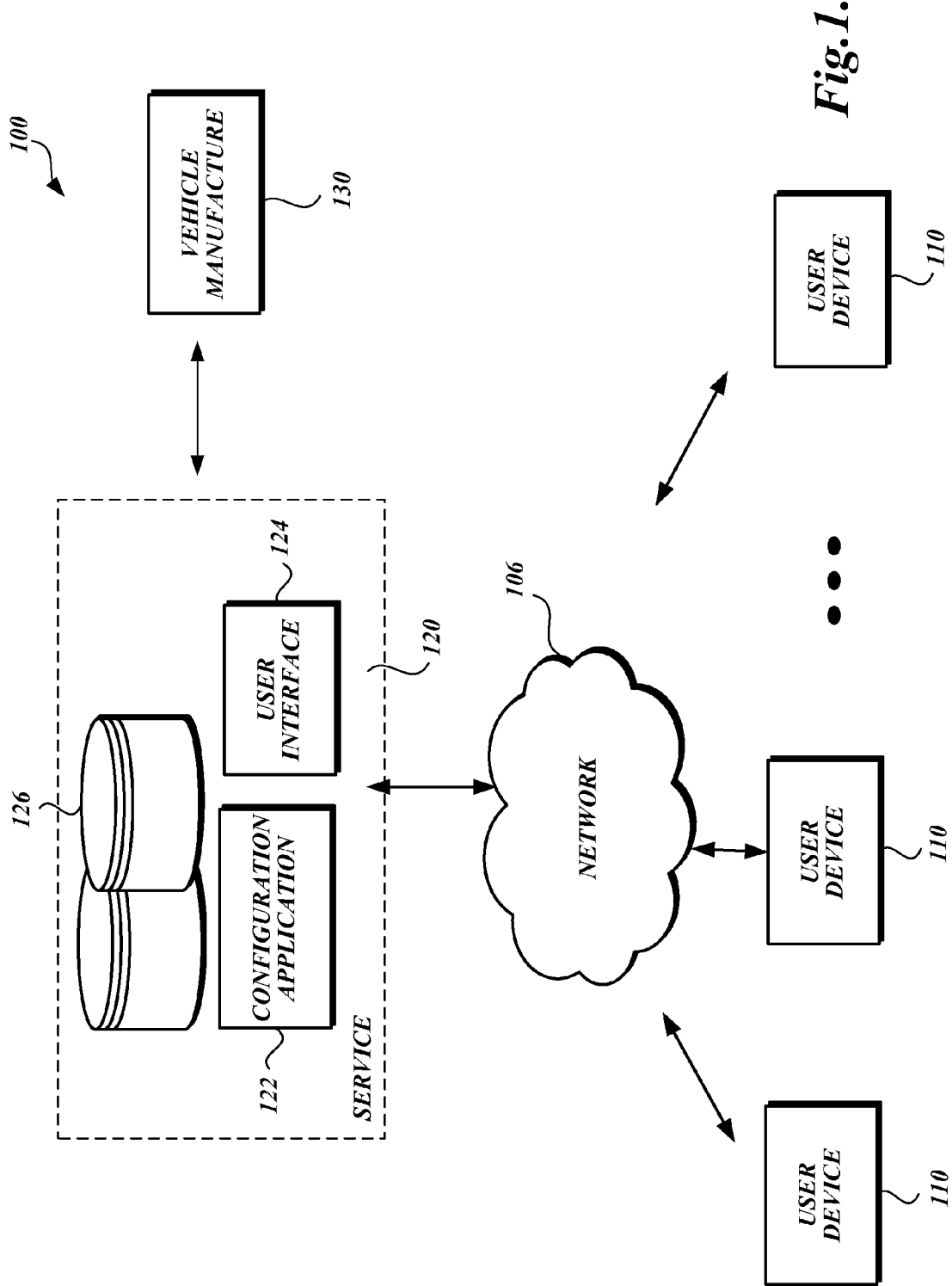

CUSTOMIZED INSTRUMENT EVALUATION AND ORDERING TOOL

BACKGROUND

With the increased popularity of the Internet, network-based product ordering services, e.g., Web sites that enable people to place an order or make purchases online, have become increasingly accepted and popular. In that regard, some Web sites allow a user to select a desired configuration for a product from a predetermined set of configurations before purchasing the product. For example, a user can purchase, over the Internet, a customized car by selecting a specific model, color, or interior/exterior options. Typically, a vehicle manufacturer does not allow a customer to change most of the attributes of an instrument panel in the vehicle.

An instrument panel provides a variety of functions within a vehicle. Gauges mounted within the panel are the primary interface between the vehicle operator and the vehicle. Typically in a vehicle, a factory installed instrument panel is designed to present a particular arrangement, e.g., a cluster of gauge-type instruments or digitized (virtual) instruments in a pre-set design. Thus, when a user wants to have a customized instrument panel, the user may have to hire a third party company that specializes in replacing the factory installed instrument panel with the customized one. However, replacing an existing instrument panel of a vehicle with the customized instrument panel can be costly and a waste of time and resources. Further, such customization, including hiring a third party company, has inherent limits and risks as well, such as the likelihood of incorrect gauge calibration. Typically, virtual type instruments, such as LCD virtual gauge instruments, are hard to replace with gauge-type instruments or vice versa. Moreover, there is no tool that allows the user to visually review or evaluate the customized instrument panel before the customized instrument panel is manufactured and installed on the vehicle.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A system and method are provided to allow a user to customize the components of a vehicle instrument panel from an Internet-enabled Web site. A user may navigate to a Web site and select a vehicle for configuration. From the Web site, input may be obtained regarding the components and appearance of an instrument panel. For example, a user may generate input to select particular types of components (e.g., display panels, gauges, etc.) and arrange where the selected components are to be located. Moreover, a user is allowed to specify a type of instrument panel, such as mechanical, virtual, or mixed instrument panel. In one aspect, the input generated by a user is translated into a build specification for assembling the instrument panel at the manufacturer. In another aspect, the system and method display a visual representation of the instrument panel based on the received user input. The user can add, delete or modify the instrument panel after reviewing and evaluating the displayed visual representation of the instrument panel.

In accordance with an aspect of an embodiment, a system is provided for facilitating a configuration service of an instrument panel. The system comprises a memory component for storing information about vehicles and information about an instrument panel of each vehicle and a computing device that is communicatively connected with the memory component. The computing device is operative to obtain information about configurable attributes of an instrument panel for a vehicle, wherein a user of a remote computing device selects the vehicle for customizing thereof and receives input from the user regarding a desired configuration of the instrument panel that includes at least one hardware instrument and at least one virtual instrument, wherein the input from the user is directed to the configurable attributes. The computing device is further operative to generate a visual representation of the instrument panel based on the received input, to render the generated visual representation of the instrument panel on the remote computing device, to generate a build specification that is designed to be used by a manufacturer for assembling an instrument panel that corresponds to the generated visual representation and to provide the build specification to a manufacturer system. In one aspect, the rendered visual representation of the instrument panel includes depictions of the hardware and virtual instruments.

In accordance with another aspect of an embodiment, a method implemented in computer-executable instructions is provided for configuring an instrument panel based on received user input. The method comprises receiving input from a user regarding desired configurations of an instrument panel of a vehicle, generating a visual representation of the instrument panel based on the received input, causing the generated visual representation of the instrument panel to be rendered on the remote computing device and receiving from the user a review regarding the visual representation of the instrument panel. If the review is satisfactory, a build order is generated that is designed to be used for assembling the instrument panel that corresponds to the generated visual representation. The build order identifies instruments that will be displayed on the instrument panel and specifies characteristics and locations of the identified instruments. The build order is provided to a manufacturer system that includes an assembly application configured to assemble the instrument panel in accordance with the build order.

In accordance with yet another aspect of an embodiment, a system is provided for facilitating a configuration service between a user and a manufacturer of a vehicle over a communication network. The system comprises a memory component for storing information about vehicles and information about an instrument panel of each vehicle, a user interface component configured to obtain input from a user and render a graphical display in a Web page and a configuration component. The configuration component is operable to generate a visual representation of an instrument panel based on the obtained input, wherein the obtained input is the desired configuration of the instrument panel, to cause the user interface component to render the generated visual representation of the instrument panel on the remote computing device, wherein the user interface component is further configured to receive from the user a review regarding the visual representation of the instrument panel and to determine whether the user's review is satisfactory. If the user's review is satisfactory, the configuration component generates a build order that is designed to be used for assembling the instrument panel that corresponds to the generated visual representation and provide the build order to a manufacturer system. The build order identifies instruments that will be displayed on the instrument panel and specifies characteristics and locations of the identified instruments.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a pictorial depiction of an exemplary system architecture that illustrates components suitable for implementing aspects of the disclosed subject matter;

DETAILED DESCRIPTION

Figure 2A:
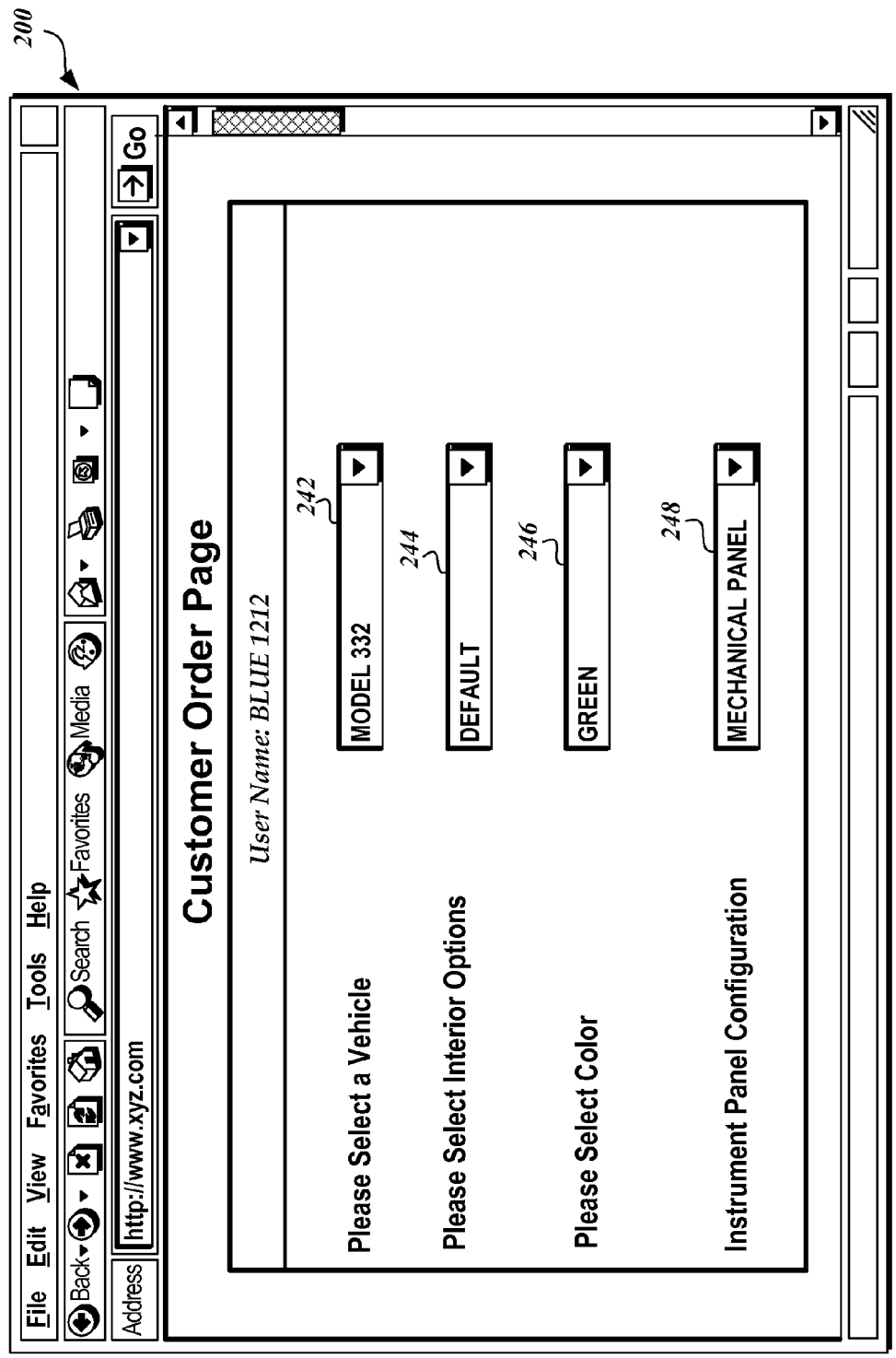
FIGS. 2A-2E and 3A-3C are exemplary graphic user interfaces where a user can customize and evaluate the configuration of an instrument panel in accordance with additional embodiments of the disclosed subject matter.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

Prior to discussing the details of the systems and methods for proving a tool to allow a user to customize and visually evaluate an instrument panel of a vehicle prior to purchase the vehicle, it should be understood that several sections of the following description are presented largely in terms of logic and operations that may be performed by conventional components. These components, which may be grouped in a single location or distributed over a wide area, generally include processors, memory, storage devices, display panels, input devices, etc. In circumstances where the components are distributed, the components are accessible to each other via communication links. The following description provides examples of the systems and methods that facilitate various services for a user to customize the configuration of an instrument panel of a vehicle and visually evaluate the user's customized configuration over the communication networks.

FIG. 1 and the following discussion is intended to provide a brief, general description of an exemplary system environment 100 for implementing aspects of the disclosed subject matter. The system environment 100 of FIG. 1 includes a service system 120 and one or more remote devices for users, such as user devices 110, by which a user (not shown) can interact with the service system 120. The user devices 110 communicate with the service system 120 via a communication network 106, such as the Internet. The user devices 110 are typically computing devices including a variety of configurations or forms such as, but not limited to, laptop or tablet computers, personal computers, personal digital assistants (PDAs), hybrid PDA/mobile phones, mobile phones, workstations, personal media players, and the like.

In FIG. 1, the service system 120 may comprise one or multiple servers or discrete components to provide configuration and purchasing services to the users. In one embodiment, a service system 120 includes one or more memory component 126, a configuration component 122, and a user interface component 124, etc. The memory component 126 may include databases for storing information relevant to the configuration and purchasing services provided by the service system 120. For example, the database stores information such as the user profile, vehicle catalogs, customizable attributes of each vehicle, a manufacturer of a vehicle, customizable attributes of an instrument panel, etc. It is noted that the term "vehicle", as used herein, generally refers to any type of vehicle, including a truck, an automobile, boat, Recreational Vehicle ("RV"), vessel, etc., that can be used to implement aspects of the present disclosure.

As will be well appreciated by one of ordinary skill in the art, the memory component 126 depicted in FIG. 1 is one example of computer-readable media suited to storing data and program modules for implementing aspects of described embodiments. As used herein, the term "computer-readable media" includes volatile and non-volatile and removable and non-removable memory, implemented in any method or technology capable of storing information, such as computer-readable instructions, data structures, program modules, or other data. By way of example, computer-readable media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information for access by the processor of the service system.

The user interface component 124 may be configured to display a graphic user interface (GUI) on the remote user device 110 to interact with a user of the remote user device 110. In an illustrative embodiment, the user interface component 124 represents the front-end of a stand-alone application, such as a Web browser. Alternatively, the user interface component 124 can be integrated with one or more software applications. As will be described in more detail below, the configuration component 122 is configured to process user input received through the user interface component 124 and to generate a representation of an instrument panel for a vehicle, a build specification for the instrument panel, and the like.

In the illustrative embodiment depicted in FIG. 1, the system environment 100 includes one or more vehicle manufacturers that are responsible for manufacturing and providing a vehicle based on a user order and/or a build specification from the service system 120. As will be described in detail below, the service system 120 may be configured to generate a file having data that describes a build specification based on user input. The data file created may be transmitted to the vehicle manufacturer and automatically loaded into a vehicle build queue for configuring the vehicle in accordance with the build specification.

One of ordinary skill in the art will appreciate that the service system 120, a vehicle manufacturer 130, and a remote device 110 for a user will include many more components than those depicted in FIG. 1. However, it is not necessary that all of these generally conventional components be shown or described.

FIGS. 2A-2E and 3A-3C illustrate exemplary graphic user interfaces (GUIs) where a user can customize configuration of an instrument panel in accordance with additional embodiments of the disclosed subject matter. In the exemplary embodiment depicted in FIG. 2A, the service system 120 (i.e., the user interface component 124 in FIG. 1) displays a GUI 200 on a screen of the user device 110, in which the user is prompted to choose a particular vehicle for customizing the configuration of an instrument panel. In that regard, the GUI 200 may provide several visual indicators representing menus, such as vehicle menu 242, interior option menu 244, color menu 246, and instrument panel configuration menu 248, each providing available choices about a particular attribute of the vehicle.

As will be appreciated, a particular vehicle may include predetermined components that are customizable by a user when ordering the vehicle over the network. In this regard, the manufacturer of the vehicle may provide the service system 120 with a vehicle catalog, including information necessary to facilitate configuration and/or ordering services. The service system 120 processes the information obtained from the manufacturer in order that the information can be easily used for configuration services. In this regard, the provided and processed information may be stored in the database of the service system 120.

In this embodiment, as the user identifies a particular vehicle of interest for a customization service, the service system 120 further prompts the user to select other attributes of the vehicle. By way of example, assume that the user has selected a particular vehicle, such as "MODEL 332" for the vehicle of their interest, as shown in FIG. 2A. In response to the user's input, the service system 120 obtains the customizable attributes of the vehicle of interest, including, but not limited to, color, interior/exterior, and instrument panel options available for the "MODEL 332" vehicle.

As will be described in further detail below, the service system 120 allows the user to start a configuration service for an instrument panel of the vehicle. As discussed above, there are several types of instrument panels that can be available for the vehicle, such as a mechanical instrument panel with hardware components, a virtual instrument panel with visual image elements representing gauges or warning indicators, or a mixed instrument panel with some hardware components and some visual image elements.

As each type of instrument panel includes different components and attributes to be customized, the GUI prompts the user to select a desired type of instrument panel to start a configuration service for an instrument panel. As shown in FIG. 2A, in this example, the user selects "MODEL 332" from the vehicle menu 242, "DEFAULT" from the interior option menu 244, "GREEN" from the color menu 246, and "MECHANICAL PANEL" from the instrument panel configuration menu 248.

FIGS. 2B-2E illustrate GUIs 200 where a user can customize the configuration of a mechanical instrument panel. A default instrument panel 202 is initially depicted to assist a user to customize various components of the instrument panel. The GUI 200 provides "PREVIOUS" button 204 and "NEXT" button 206 so that the user can go back to the previous screen of the GUI 200 or move to the next screen of the GUI 200. In the exemplary embodiments depicted in FIGS. 2B-2E, a user can customize several attributes of the default instrument panel 202, including, but not limited to, "PANEL HARDWARE" 212, "COLOR" 214, "MATERIAL" 216, "FINISH" 218, and the like.

Figure 2B:
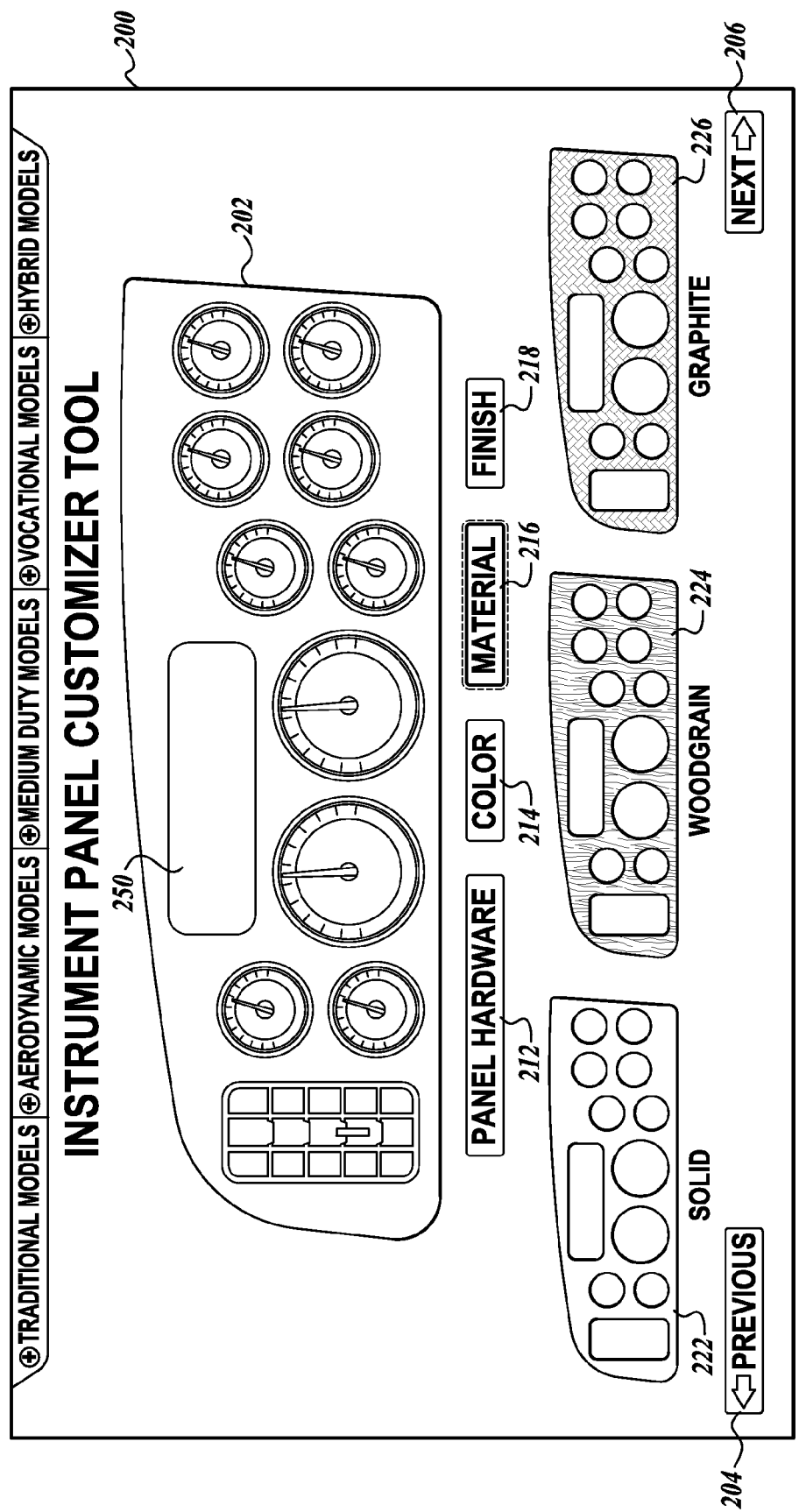
Figure 2C:
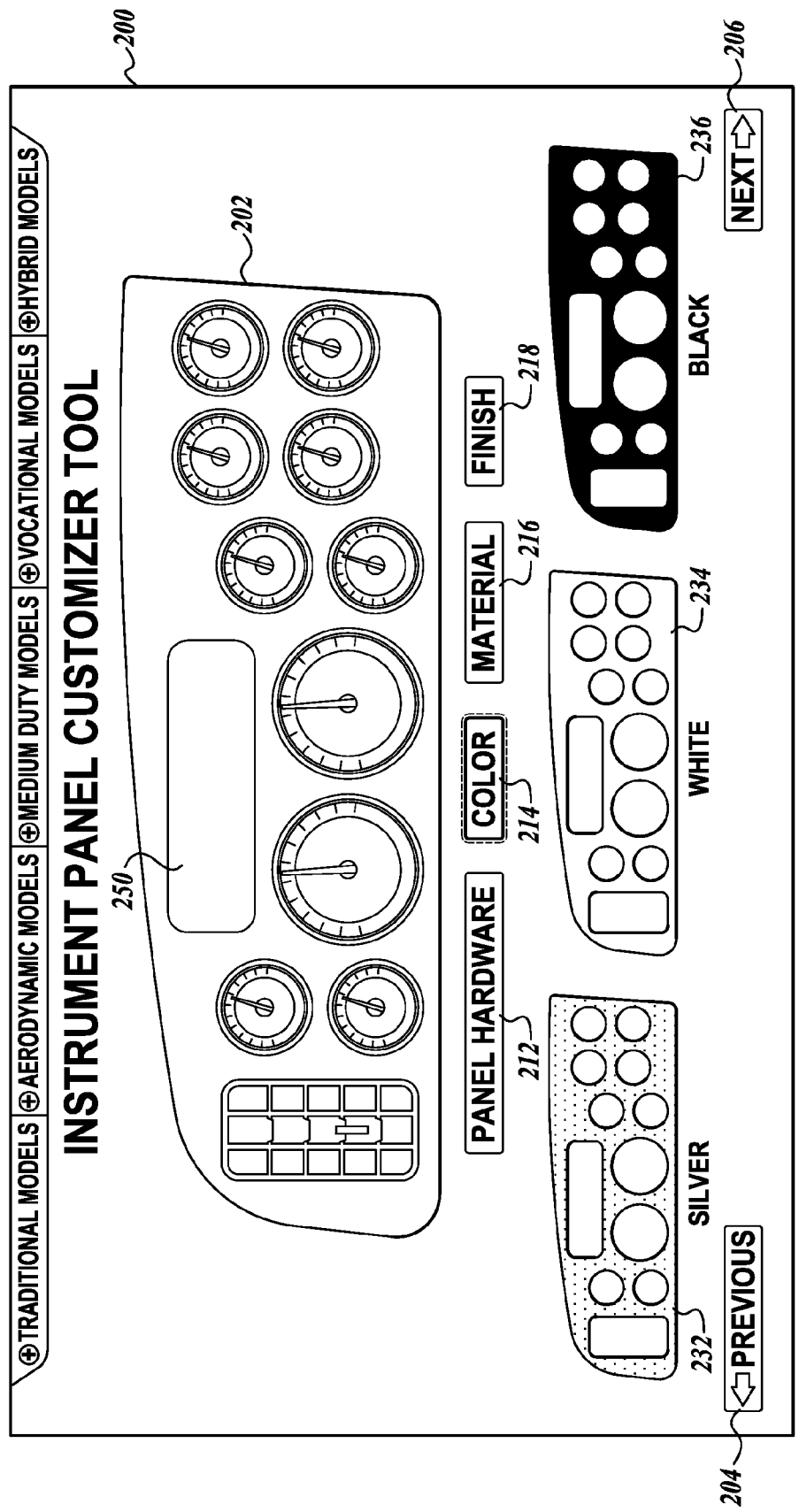
Figure 2D:
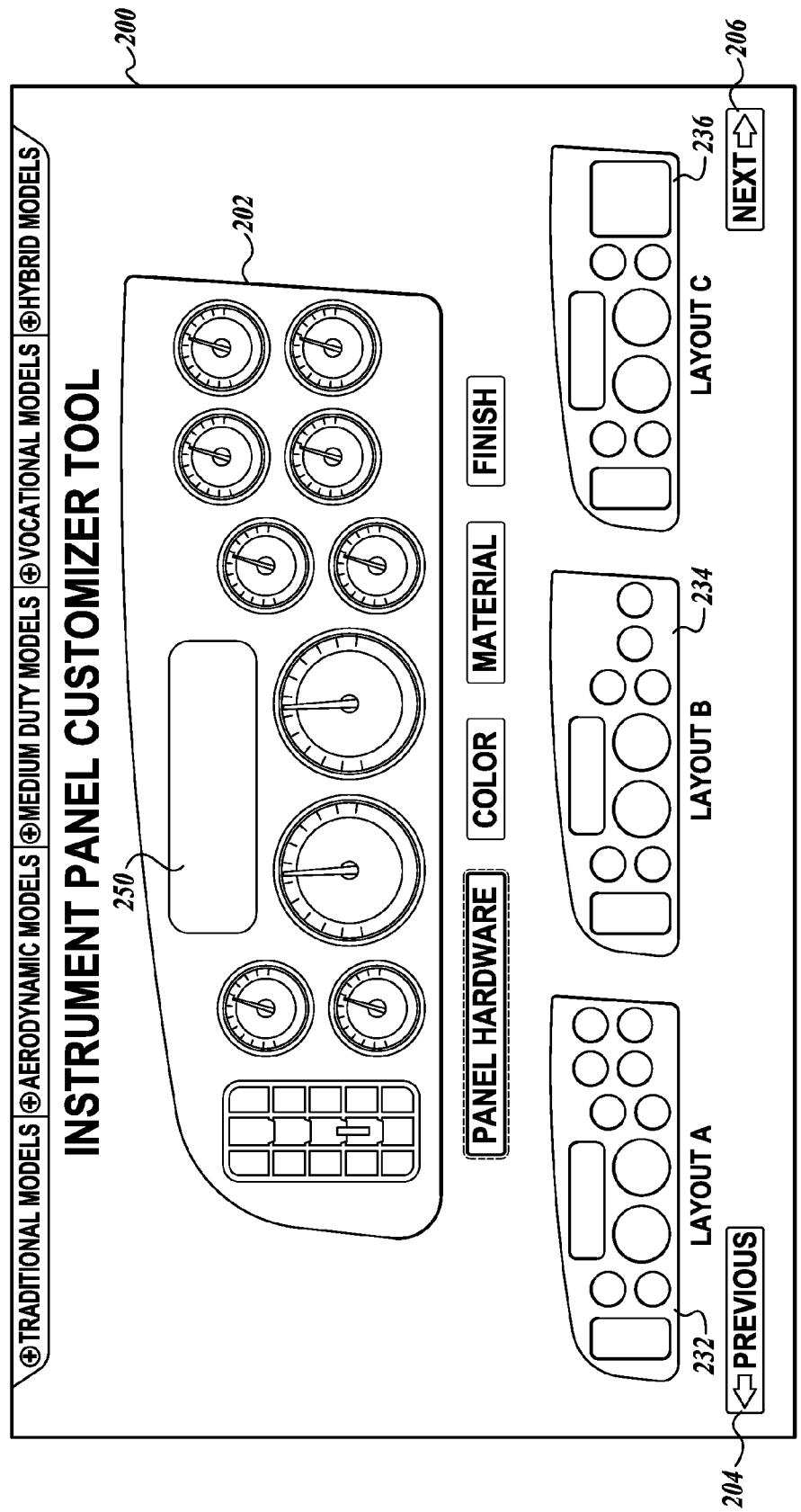

As shown in FIG. 2B, the GUI 200 may present to the user a set of predetermined materials, such as "SOLID" 222, "WOODGRAIN" 224, and "GRAPHITE" 226, available for the instrument panel cover. Likewise, the GUI 200 may present to the user a set of predetermined colors, such as "SILVER" 232, "WHITE" 234, and "BLACK" 236, available for the instrument panel cover, as depicted in FIG. 2C. In some embodiments, the user can select a desired layout of the instrument panel. As shown in FIG. 2D, a set of predetermined layouts, such as "LAYOUT A" 252, "LAYOUT B" 254, and "LAYOUT C" 256 of instrument panels may be presented in the GUI 200 for configuration of the instrument panel.

Although it is not shown, the user can add or remove a particular hardware component into/from the displayed instrument panel 202. Further, the user can change the appearance of the hardware component face or accessories. In that regard, the user can customize some characteristics of the hardware components, such as a gauge face, gauge mounting cup, desired gauges, etc., that are to be installed on the selected layout.

In one aspect, after the user finishes customizing the configuration of the instrument panel, the user has an option to review and evaluate before manufacturing of the instrument panel. In that regard, an image of the instrument panel may be simulated in accordance with the user's configuration, which may be presented to the user. In response to presentation of the simulated instrument panel, the user can examine and review the final product look of the configuration. The user can then decide whether or not to proceed with manufacturing the instrument panel based on the configuration.

Figure 2E:
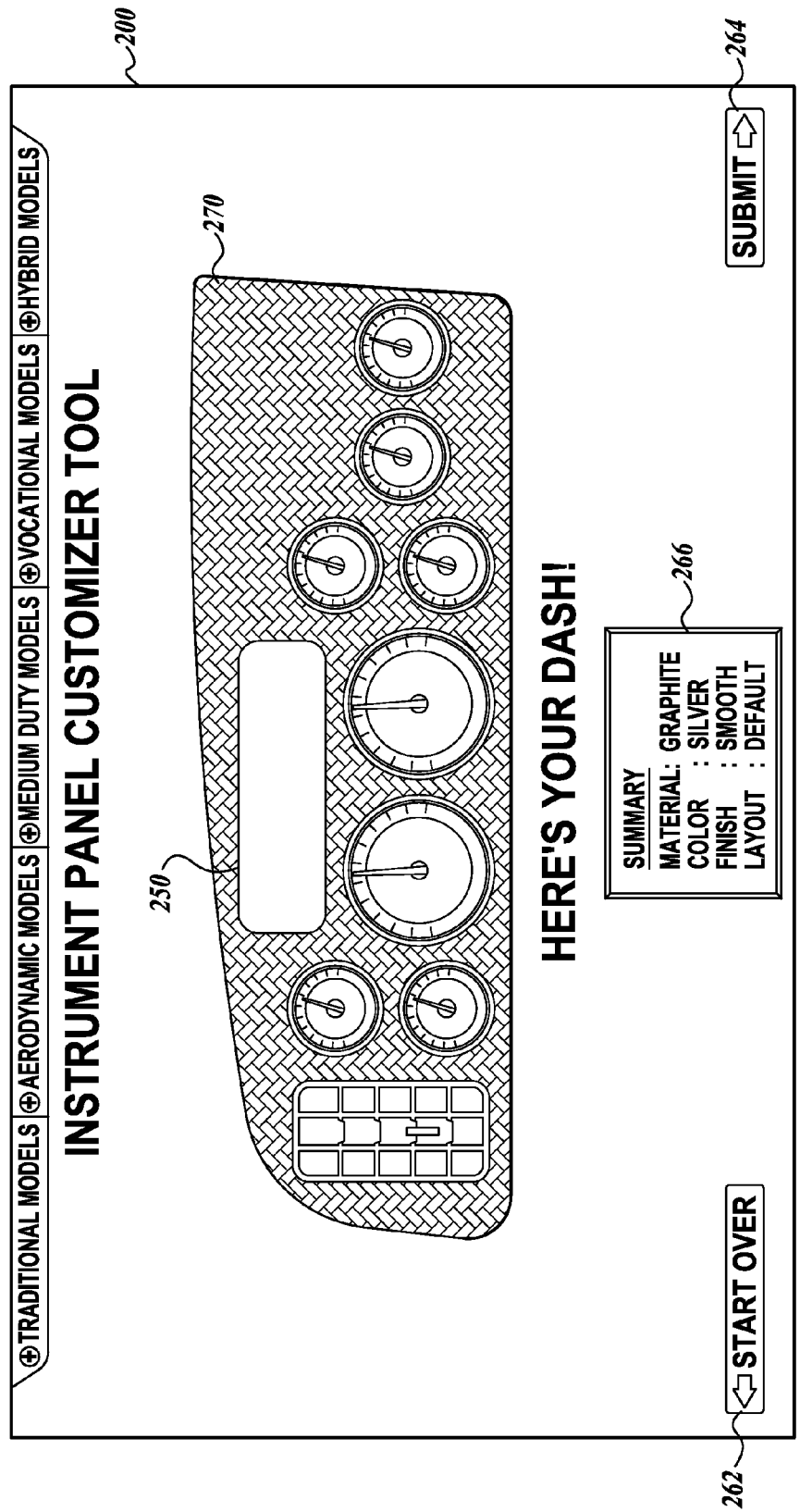

FIG. 2E includes an exemplary GUI 260 depicting the simulated image 270 of the final-product-to-be of the instrument panel, based on the user's configuration. In the exemplary GUI 260, the simulated image 270 is rendered based on the desired configuration of the instrument panel including the "GRAPHITE MATERIAL," "SILVER COLOR," "SMOOTH FINISH," and "DEFAULT LAYOUT" attribute values. In some embodiments, a brief summary 266 of the user's configurations may be also provided. The user reviews the simulated image to see and feel if the configuration would result in what the user wants. After the review and evaluation of the simulated image 270, if it is not satisfactory, the user can restart the configuration service with the service system 120 by pressing the "START OVER" button 262. Alternatively, the user can choose to change some attributes of the instrument panel represented in the simulated image. In that regard, the service system 120 may instantaneously store the user's inputs regarding the configuration so that the user can stop their configuration service anytime and resume the configuration service later without the need to provide previously entered user inputs again.

If the review and evaluation of the simulated image is satisfactory, the user may finalize and submit the configuration by indicating to place an order for the vehicle with the simulated instrument panel installed. Upon receipt of a user's indication to finalize, the service system 120 may create a build specification for the instrument panel based on the submitted configuration and forward the build specification to the manufacturer of the vehicle. The selected attributes of the vehicle, such as model number, color, horse power, etc., are also forwarded to the manufacturer. In the exemplary screen depicted in FIG. 2E, the user can press the "SUBMIT" button 264 to finalize the configuration.

In some instances, a user may choose to have a virtual instrument panel installed in a vehicle. As will be well understood, the virtual instrument panel consists of virtual image elements representing gauges, warning indicators, etc., that convey information about specific vehicle conditions. In one aspect, when the virtual or mixed instrument panel is selected, the visual characteristics and attributes (e.g., size, location, color, etc.) of the virtual image elements may be configured through a configuration service provided by the service system 120. Similar to the configuration services for the mechanical instrument panel, the user is allowed to select particular types of visual image elements and arrange where each of the selected virtual image elements will be located.

Figure 3A:
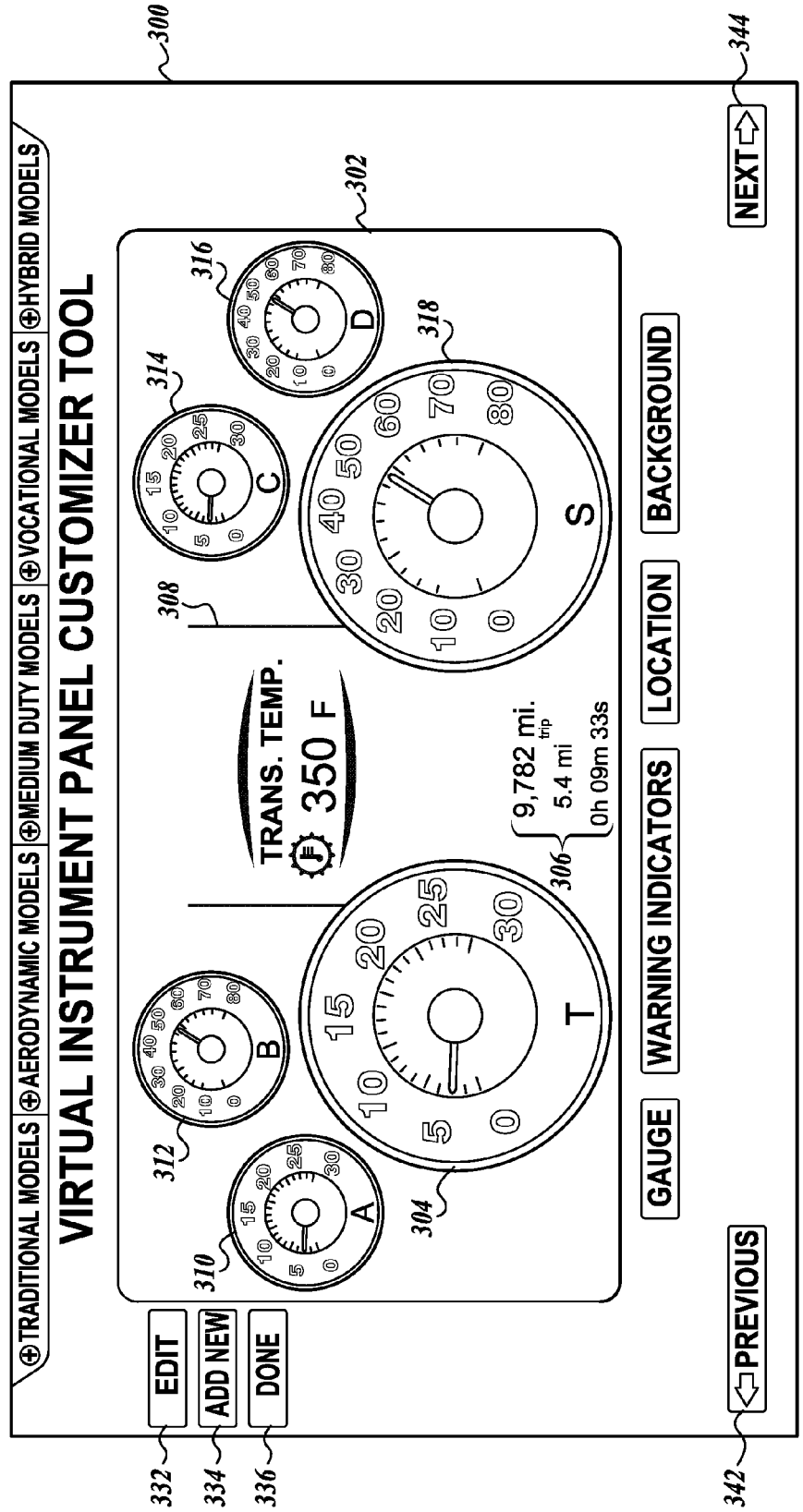
Figure 3B:
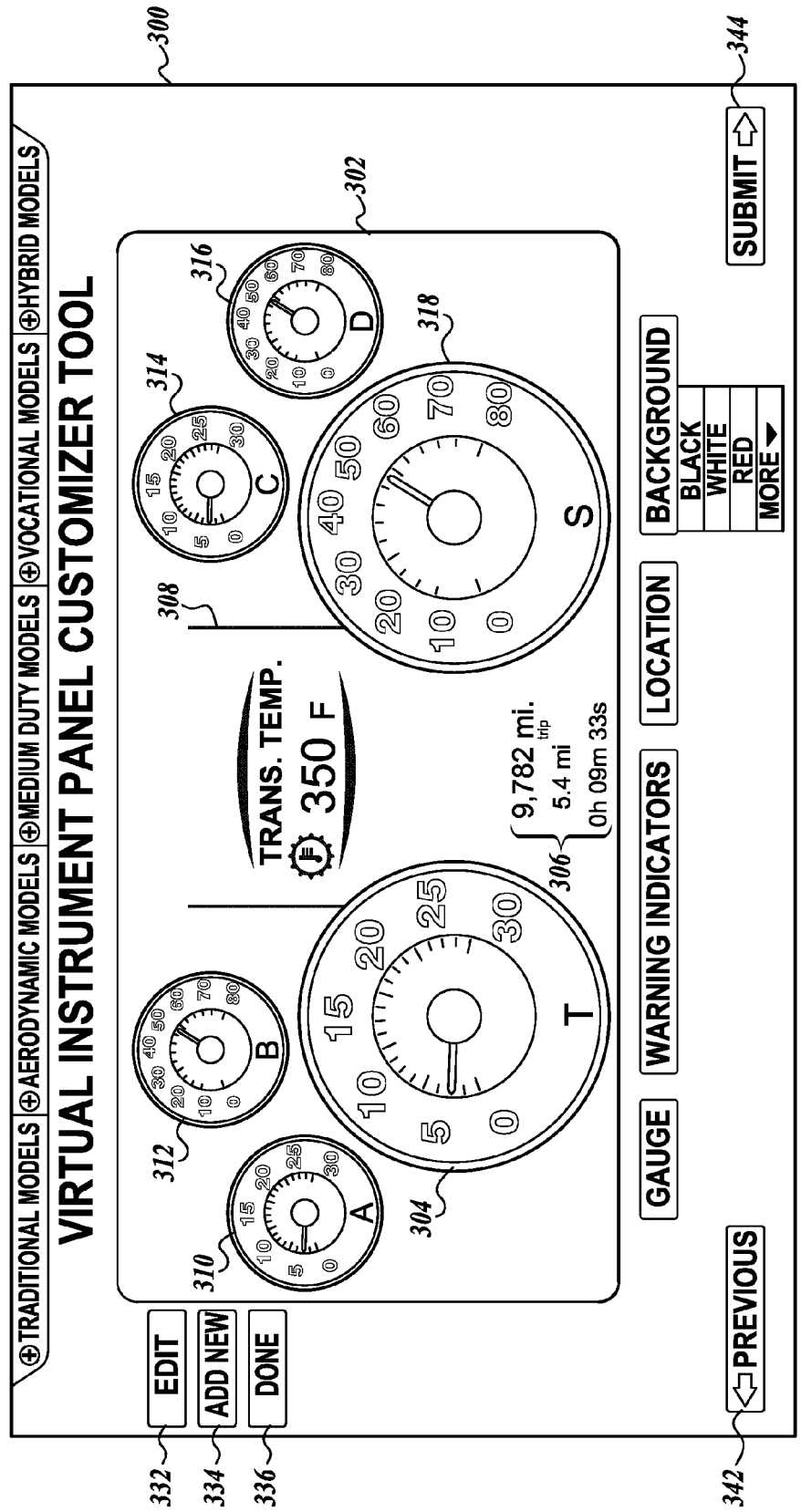
Figure 3C:
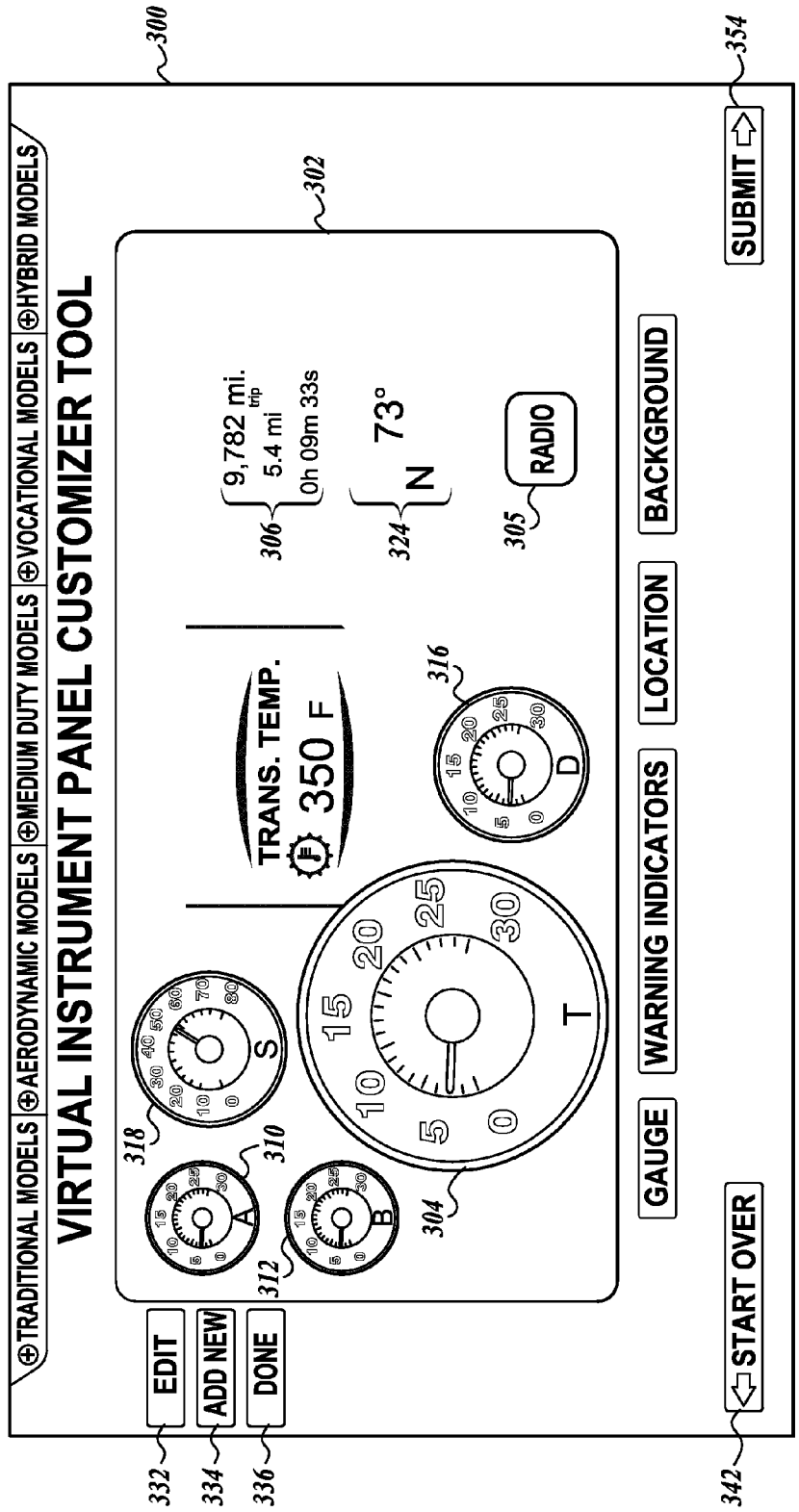

FIGS. 3A-3C illustrate GUIs 300 where a user can customize the configuration of a virtual instrument panel in accordance with additional embodiments of the disclosed subject matter. A default instrument panel 302 is initially depicted to assist a user to customize various components of the instrument panel. Generally, the default virtual instrument panel 302 has been predefined by a manufacturer and such default virtual instrument panel information is provided from a manufacturer and then properly stored in the database. Within the GUI 300, the user can add, delete, and modify visual image elements to/from the default virtual instrument panel 302 to achieve their desired configuration. In that regard, the GUI 300 may include several menu options, for example, "EDIT" menu option 332, "ADD NEW" menu option 334, "DONE" menu option 336.

In the exemplary embodiment depicted in FIG. 3A, the default virtual instrument panel 302 may include the visual image elements 304, 306, 308, 310, 312, 314, 316, 318 that represent a variety of gauges that are customizable, including, but not limited to, a speedometer, tachometer, headlight indicator, oil pressure gauge, fuel gauge, temperature gauge, voltmeter, turn signal indicator, cruise control indicator, fuel economy indicator, and a navigation indicator, among others. The default instrument panel 302 may include the visual image elements in a default size and location with a default background color. FIG. 3B depicts the GUI 300 where the user can change the background color of the default instrument panel 302.

In addition or alternatively, the service system 120 allows a user to change the characteristics/attributes of a visual image element that represents a particular gauge. If a user selects to change the appearance of a particular visual image element, for example wanting to have an enlarged tachometer, the user can interact with the GUI to enlarge the visual image element 312 representing a tachometer. In this regard, the user can click the image elements 312 representing the tachometer using a pointing device such as a mouse and then change the size of it by dragging the selected image to a desired size. In addition or alternatively, the user can manually enter the desired attribute values. By way of example only, a user presses the "EDIT" menu option 332 provided in the GUI 300 in FIGS. 3A-3C, and the GUI 300 may display several names of virtual image elements that are currently included in the default panel. The user selects a name of a particular virtual image element, and the GUI 300 then may prompt the user to input the desired attributes for the selected gauge display. The user can manually provide to the service system 120 information regarding the width, length, color, or the like.

Upon any changes made by the user, the representation of the updated virtual image element may be shown on the virtual panel so that the user can review and evaluate the changes in the virtual image element. FIG. 3C shows the appearance and location of the visual image element 318 and the locations of various visual image elements (e.g., 306, 310, 312, 316) have been changed from the default virtual panel 302 depicted in FIG. 3B. Further, a user removed visual image element 314 and added new visual image elements (e.g., element 324 (showing "N" and "73°"), element 305 (showing "Radio")) in the space where virtual element 318 was previously placed.

Similar to the mechanical panel, the service system 120 may instantaneously store the user's inputs regarding the configurations so that the user can stop their configuration service at any time and resume the configuration service later without having to provide previously entered user inputs again.

If the currently displayed virtual panel is satisfactory, the user can finalize and submit the configuration to the service system 120. In the GUI of FIG. 3C, the user can press the "SUBMIT" button 354 to finalize the configuration. Upon receipt of the user's request to finalize, the service system 120 may create a build specification for the instrument panel based on the configuration and forward the build specification to the manufacturer of the vehicle. The selected attributes of the vehicle, such as model number, color, horse power, etc., are also forwarded to the manufacturer.

In some instances, a user wants to have a mixed type instrument panel that includes at least one hardware component and at least one visual image element. By way of example only, with reference back to FIG. 2A, the mechanical instrument panel can includes a visual display window 250 where some virtual image elements can be displayed along with the hardware components. As with customizing the virtual instrument panel, a user can select each virtual image element to be displayed in the visual display window 250 and customize the visual display window 250 through the configuration service discussed above in connection with FIGS. 3A-3C.

In one embodiment, the service system 120 may provide a GUI displaying a default visual display window that has been predetermined for the selected vehicle, to assist a user in customizing the virtual portion of the instrument panel. As will be appreciated, the GUI is provided so that the service system 120 can interact with the user when receiving user inputs regarding configurations. Likewise, the mechanical portion of the panel can be customized in a manner similar to that discussed in connection with FIGS. 2A-2E. In this way, the instrument panel may include a combination of hardware components and virtual instrument components that are customizable, including, but not limited to, a speedometer, tachometer, headlight indicator, oil pressure gauge, fuel gauge, temperature gauge, voltmeter, turn signal indicator, cruise control indicator, fuel economy indicator, and a navigation indicator, among others.

In one aspect, the service system 120 may store the user's inputs regarding the configurations so that the user can stop their configuration service anytime and resume the configuration service later without providing previously entered user inputs again. After the user finishes customizing the configuration of the mixed-type instrument panel, the user has an option to review and evaluate the instrument panel prior to manufacturing of the instrument panel. In that regard, the service system 120 simulates an image of the instrument panel including a mechanical portion and a virtual portion in accordance with the user's configuration, which may be presented to the user.

In response to the presentation of the simulated instrument panel, the user can examine and evaluate the final product look of the configuration. The user can then decide whether or not to move forward with manufacturing the panel based on the configuration.

It is noted that the screen displays and examples described in FIGS. 2A-2E and 3A-3C are discussed only for exemplary purposes. As one of ordinary skill in the art would appreciate, depending on a particular vehicle and manufacturer, there are various different attributes and values available for customizing configuration of the instrument panel. Thus, the discussed and described screen displays and examples should not be considered as limiting the scope of the disclosed subject matter.

Now with reference to FIG. 4, a flow diagram will be described that depicts one exemplary embodiment of a routine 400 for allowing customized configurations of an instrument panel in accordance with the disclosed subject matter.

In one embodiment, the routine 400 may be implemented by the configuration module 120 in connection with the user interface module 130 in the service system 120 (FIG. 1). For the sake of discussion, it is assumed that a user has selected a desired vehicle and identified a mixed type instrument panel to be installed in the vehicle. Subsequently, the service system obtains information about the mixed instrument panel that is necessary to facilitate the configuration service.

Figure 4:
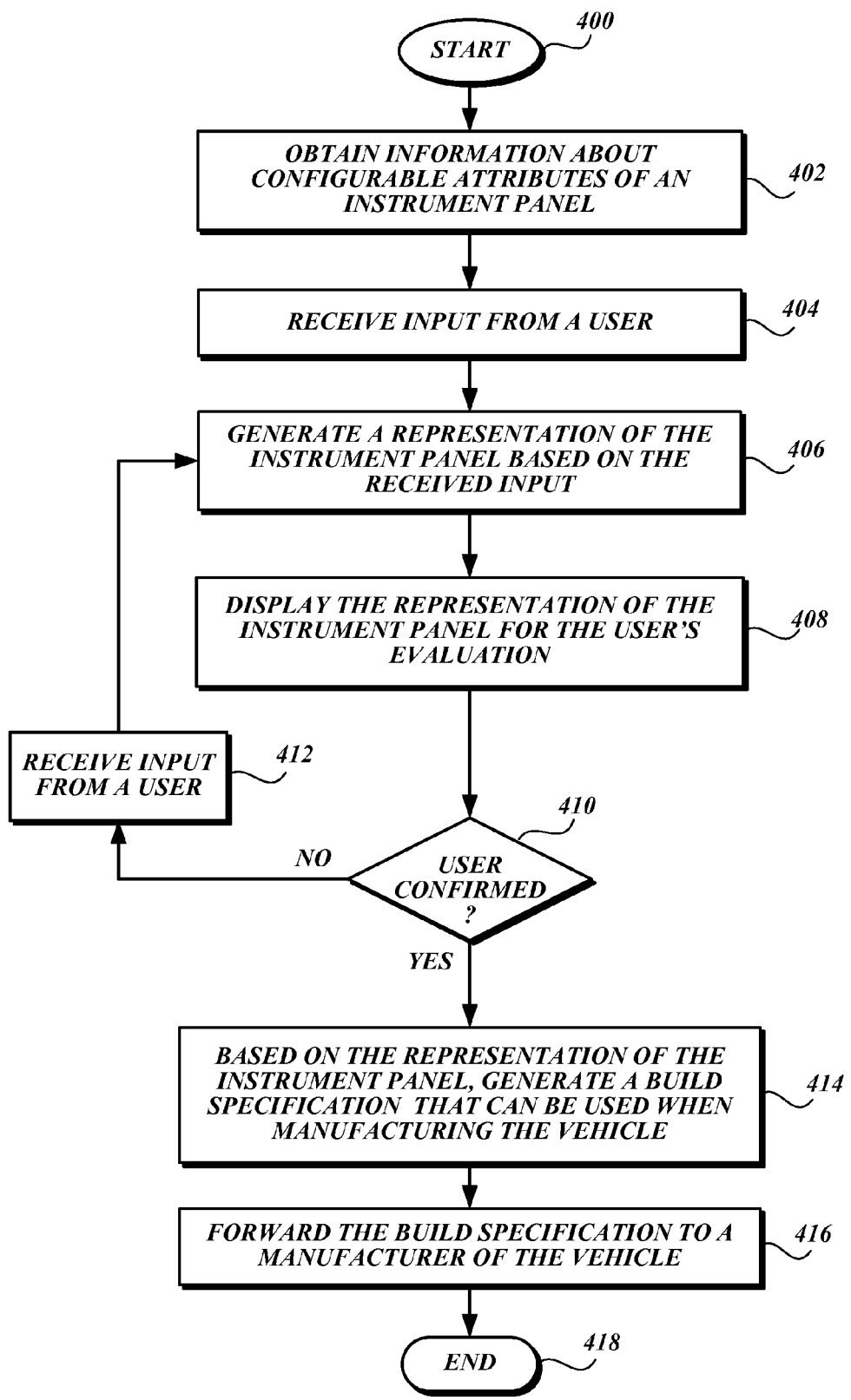
FIG. 4 is a flow diagram of a method for customizing and evaluating configuration of the instrument panel in accordance with additional embodiments of the disclosed subject matter.

As illustrated in FIG. 4, the routine 400 begins at block 402 where the routine obtains, from a database, information about configurable attributes of an instrument panel for the selected vehicle. In one embodiment, a default instrument panel may be displayed on a remote device of the user. In this regard, a GUI similar to the GUI depicted in FIGS. 2A-2E and 3A-3C may be presented to the user to assist the user to customize the configuration of the instrument panel.

At block 404, the routine 400 receives the user input identifying desirable attributes of virtual image elements to be displayed and hardware components to be included in the instrument panel. As described above, a user can initially be presented with a default instrument panel. The user can add, delete, or change a visual image element and/or hardware component included in the default instrument panel to customize the configuration. In some embodiments, a user can start from scratch, i.e., an empty instrument panel. The user can identify desired virtual image elements and hardware components, their appearance, and placement on the empty instrument panel.

At block 406, based on the user input, logic implementing the routine 400 generates a representation of the instrument panel that is used to present the simulated image of the instrument panel to the user. For example, the representation of the instrument panel that includes at least one hardware instrument and at least one virtual instrument (visual image element) is generated. At block 408, the generated representation of the instrument panel, i.e., the simulated image of the instrument panel, is displayed for the user's review and evaluation. In this regard, the service system 120 (i.e., the user interface module 130) renders the simulated image of the instrument panel in accordance with the user's customized configuration.

At a decision block 410, it is determined whether the user has confirmed the configuration after reviewing and evaluating the simulated image. If it is determined that the user does not confirm the configuration because the configuration is not satisfactory, the routine 400 proceeds to block 412 where the user is allowed to modify the configuration or start a new configuration service for the instrument panel. The routine 400 returns to block 406 and repeats the above mentioned steps. If it is determined that the user confirms the configuration, the routine proceeds to block 414 where it causes the service system 120 to generate a build specification (build order) that can be used to assemble the instrument panel in the vehicle at the manufacturer. At block 416 the build specification of the panel is forwarded to a manufacturer of the vehicle.

By way of example, the service system 120 may be configured to generate a file having data that describes the build specification based on user input. The data file created may be transmitted to the vehicle manufacturer and automatically loaded into a vehicle build queue for configuring the vehicle in accordance with the build specification. The data file may be in a suitable file format to be automatically loaded into a vehicle build queue for configuring the vehicle and/or the panel in accordance with the customized configurations. In one embodiment, the vehicle manufacturer's system may include an assembly application component for assembling a customized instrument panel based on the loaded data file. In one embodiment, the service system 120 may forward a generated build specification about a vehicle to the manufacturer. In one aspect, the service system 120 may serve as an interface between the Web site that obtains user configuration data and a vehicle manufacturer's system that manages assembly of the vehicle. After forwarding the build specification at 416, the routine 400 completes at block 418.

It should be well understood that the routine 400 described above with reference to FIG. 4 does not show all of the functions performed when a user customizes configuration of an instrument panel. Instead, the routine 400 describes exemplary embodiments of the disclosed subject matter, such as the process of configuration of a mixed type instrument panel. It is noted that similar steps can be implemented to configure a mechanical or a virtual instrument panel. Those skilled in the art and others will recognize that some functions may be performed in a different order, omitted/added, or otherwise varied without departing from the scope of the claimed subject matter.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system for facilitating configuration of an instrument panel, the system comprising:
  a memory component configured to store information about vehicles and information about an instrument panel of each vehicle; and
  a first computing device, communicatively connected with the memory component, the first computing device configured to:
    activate an instrument panel configuration service;
    obtain information about configurable attributes of an instrument panel for a vehicle;
    receive first user input via the instrument panel configuration service regarding a desired configuration of the instrument panel that includes at least one hardware instrument and at least one virtual instrument, wherein the first user input is received from a remote computing device and is directed to at least one of the configurable attributes, and wherein the at least one configurable attribute comprises a visual attribute of the at least one virtual instrument;
    store information representing the desired configuration of the instrument panel;
    stop the instrument panel configuration service responsive to second user input;
    resume the instrument panel configuration service responsive to third user input;
    obtain the stored information representing the desired configuration of the instrument panel;
    receive fourth user input via the instrument panel configuration service regarding a modification to the desired configuration of the instrument panel;
    generate a visual representation of the instrument panel based on the received first and fourth user input, wherein the visual representation of the instrument panel includes depictions of the hardware and virtual instruments; and
    generate a build specification that is designed to be used by a manufacturer for assembling an instrument panel that corresponds to the generated visual representation.

2. The system of claim 1, wherein the build specification identifies the instruments, including the at least one hardware instrument to assemble into the instrument panel, and the at least one virtual instrument to be displayed on the instrument panel.

3. The system of claim 2, wherein the build specification defines characteristics and placements of the identified instruments.

4. The system of claim 1, wherein the first computing device is further configured to provide the build specification to a manufacturer system, and wherein the manufacturer system includes an assembly application that is configured to assemble the instrument panel in accordance with the build specification.

5. The system of claim 1, wherein the obtained information about configurable attributes of the instrument panel is configured to be presented to a user to assist the user in customizing the configuration of the instrument panel.

6. The system of claim 1, wherein a hardware cover of the instrument panel is customized.

7. The system of claim 1, wherein the first or fourth user input indicates replacement of a hardware instrument with a virtual instrument that is a visual image of the corresponding hardware instrument.

8. The system of claim 1, wherein the first or fourth user input indicates replacement of a virtual instrument with a hardware instrument that provides the same functionality.

9. The system of claim 1, wherein the first computing device is further configured to cause the generated visual representation to be rendered on the remote computing device.

10. The system of claim 1, wherein the first computing device is further configured to receive user input that indicates modification of the configuration after the visual representation is generated.

11. The system of claim 1, wherein the first computing device is further configured to receive user input that confirms the configuration, which causes the computing system to generate the build specification.

12. The system of claim 1, wherein the first computing device is further configured to:
   receive further user input regarding configuration of a second instrument panel;
   generate a second visual representation based on the further user input, wherein the second visual representation includes a depiction of the second instrument panel; and
   generate a second build specification that is designed to be used by the manufacturer for assembling the second instrument panel.

13. A computer implemented method for facilitating configuration of an instrument panel, the method comprising:
   activating an instrument panel configuration service;
   obtaining information about configurable attributes of an instrument panel for a vehicle;
   receiving first user input via the instrument panel configuration service regarding a desired configuration of the instrument panel that includes at least one hardware instrument and at least one virtual instrument, wherein the first user input is received from a remote computing device and is directed to at least one of the configurable attributes, and wherein the at least one configurable attribute comprises a visual attribute of the at least one virtual instrument;
   storing information representing the desired configuration of the instrument panel;
   stopping the instrument panel configuration service responsive to second user input;
   resuming the instrument panel configuration service responsive to third user input;
   obtaining the stored information representing the desired configuration of the instrument panel;
   receiving fourth user input via the instrument panel configuration service regarding a modification to the desired configuration of the instrument panel;
   generating a visual representation of the instrument panel based on the received first and fourth user input, wherein the visual representation of the instrument panel includes depictions of the hardware and virtual instruments; and
   generating a build specification that is designed to be used by a manufacturer for assembling an instrument panel that corresponds to the generated visual representation.

14. The method of claim 13, further comprising receiving further user input after the visual representation is generated and prior to generating the build specification.

15. The method of claim 14, wherein generating the build specification is based at least in part on the further user input.

16. The method of claim 13, further comprising rendering the generated visual representation of the instrument panel on the remote computing device.

17. The method of claim 13, further comprising providing the build specification to a manufacturer system.

18. The method of claim 13, wherein the first or fourth user input indicates removal of an instrument from the instrument panel.

19. The method of claim 13, wherein the first or fourth user input indicates addition of a new instrument to the instrument panel.

20. The method of claim 13, wherein the first or fourth user input indicates replacement of an instrument on the instrument panel by a new instrument on the instrument panel.

* * * * *